US006981637B2

(12) United States Patent
Nagayoshi et al.

(10) Patent No.: US 6,981,637 B2
(45) Date of Patent: Jan. 3, 2006

(54) AUTOMATIC TELLER MACHINE

(75) Inventors: Hiroto Nagayoshi, Kokubunji (JP); Noriaki Fujimura, Owariasahi (JP); Hiroshi Sako, Shiki (JP); Tatsuhiko Kagehiro, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/369,658

(22) Filed: Feb. 21, 2003

(65) Prior Publication Data

US 2004/0084521 A1 May 6, 2004

(30) Foreign Application Priority Data

Nov. 5, 2002 (JP) ............................ 2002-320627

(51) Int. Cl.
*G06F 17/60* (2006.01)

(52) U.S. Cl. ...................................... 235/379; 235/385

(58) Field of Classification Search ................ 235/379, 235/380, 385; 902/9, 11, 12, 15; 705/1, 705/28, 40

See application file for complete search history.

(56) References Cited

U.S. PATENT DOCUMENTS

| | | | | |
|---|---|---|---|---|
| 4,398,088 A | | 8/1983 | Hirose et al. | |
| 4,571,489 A | * | 2/1986 | Watanabe | 235/379 |
| 5,686,713 A | * | 11/1997 | Rivera | 235/380 |
| 6,241,244 B1 | * | 6/2001 | Modi | 209/588 |
| 6,607,081 B2 | * | 8/2003 | Graef et al. | 209/534 |

FOREIGN PATENT DOCUMENTS

| | | |
|---|---|---|
| EP | 0881 603 A1 | 1/1997 |
| EP | 0871 149 A1 | 3/1998 |
| JP | 64-041085 | 8/1987 |
| JP | 64-041088 | 8/1987 |
| JP | 10-302112 | 4/1997 |
| JP | 2000-348234 | 6/1999 |
| WO | WO 00/23952 | 10/1999 |

* cited by examiner

*Primary Examiner*—Daniel Stcyr
(74) *Attorney, Agent, or Firm*—Reed Smith LLP; Stanley P. Fisher, Esq.; Juan Carlos A. Marquez, Esq.

(57) ABSTRACT

An automatic teller machine capable of verifying the authenticity of bank notes while maintaining high-speed execution of transactions. The machine comprises a bill validator outputs a result of verification of whether a received note could be classified or not, and a cash box for notes unclassified by verification results, and a cash box for notes other than unclassified notes. After transaction hours, re-verification is carried out, in which notes are retrieved one sheet at a time from the unclassified note box and sensed again by a sensor, and the bill validator receives a signal from the sensor and re-verifies the note by using an algorithm with higher accuracy than in verification at the time of a receiving transaction.

18 Claims, 12 Drawing Sheets

AUTOMATIC TELLER MACHINE

BACKGROUND OF THE INVENTION

The present invention relates to an automatic teller machine.

In automatic teller machines used in financial institutions, at least one means for verifying a bank note is mounted which makes decisions about the denomination, counterfeit or genuine, and fitness of the note received. In recent years, many cases of counterfeit notes have been reported, and therefore it has become imperative to improve the accuracy of classification of counterfeit and genuine notes, above all else. However, if one tries to securely reject elaborate counterfeit notes, a percentage of genuine notes being rejected increases due to sensor fluctuation, fluctuation of transport condition or the like, which has been a problem.

Meanwhile, high-speed process is important in automatic teller machines. Since customers must wait while the transaction process is underway, high-speed process leads to an improvement in service. However, to this end, it is necessary to shorten verification time and increase transportation speed. Since high speed and high verification accuracy are not compatible, another problem is that when high speed in process is pursued, the incidence of genuine notes being rejected increases.

As prior art to solve the problem of the increasing number of rejects, there is a method of re-verifying the rejected ones of notes received, as disclosed in, for example, JP-A-10-302112. In this equipment using this method, when a rejected note occurs at the time of a money receiving transaction, the note in question is transferred at low speed to re-verify it, by which the problem of the rising proportion of rejects by a greater fluctuation in transportation attributable to high-speed transportation can be solved.

There is another conventional method using a bill validator of a two-stage structure, as disclosed in JP-A-1-41085. In this method, verification is carried out in a device at the first stage, and those notes which have not been verified for reasons of the note being likely to be a counterfeit or abnormality in transportation are sent to the second-stage verification unit. In this second stage, a detailed process of counterfeit/genuine classification is carried out using the bill validator in a manner to assist classification by humans thereby improving the accuracy of classification.

In the technology described in Patent Document 1, however, when a note received is rejected, it has been necessary to execute re-verification during a transaction. Even if rejected notes account for a small proportion of notes received by the ATM, they definitely increase the transaction time by the length of time for re-verification. The technology set out in JP-A-1-41085 was intended for use in a large-scale bill verification equipment. Because the second-stage bill validator was an auxiliary unit for man-operated classification of counterfeits and genuine notes, this device could not be applied to automatic teller machines installed in banking facilities.

SUMMARY OF THE INVENTION

The object of the present invention is to provide an automatic teller machine capable of verification with high accuracy and less liable to reject genuine notes while maintaining the regular high-speed performance. The present invention is suitable for automatic teller machines (ATM) installed in banking facilities.

To achieve the above abject, according to the present invention, an automatic teller machine has a cash in/out unit; means for transporting the note; a control unit for controlling various parts; a sensor for sensing a note; and verification means for receiving signal information collected by the sensor, verifying the note by said signal information, and outputting information about a result of the verification of whether the note was classified or unclassified, the automatic teller machine further comprising first note housing means for housing notes unclassified by results of verification and second note housing means for housing notes other than the unclassified notes.

After transaction hours, notes are transported, one note at a time, at low speed from the unclassified note housing means, each note is re-sensed by the sensor, and the verification means receives a signal output by the sensor and re-verifies the note by using an algorithm with higher accuracy than in the verification during the cash receiving transaction.

Other objects, features and advantages of the invention will become apparent from the following description of the embodiments of the invention taken in conjunction with the accompanying drawings.

DETAILED DESCRIPTION OF THE INVENTION (Embodiment 1)

Figure 1:
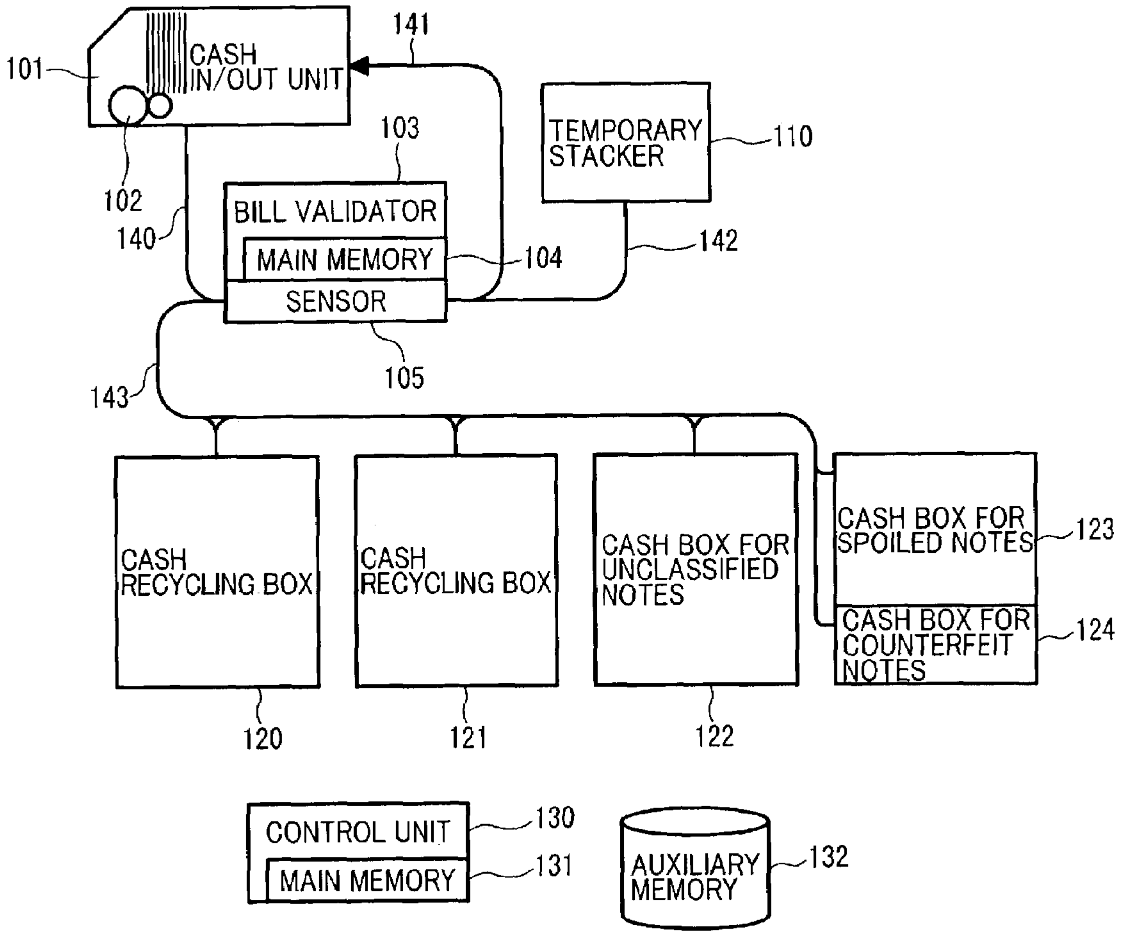
FIG. 1 is a block diagram of an automatic teller machine according to a first embodiment of the present invention.
Figure 2:
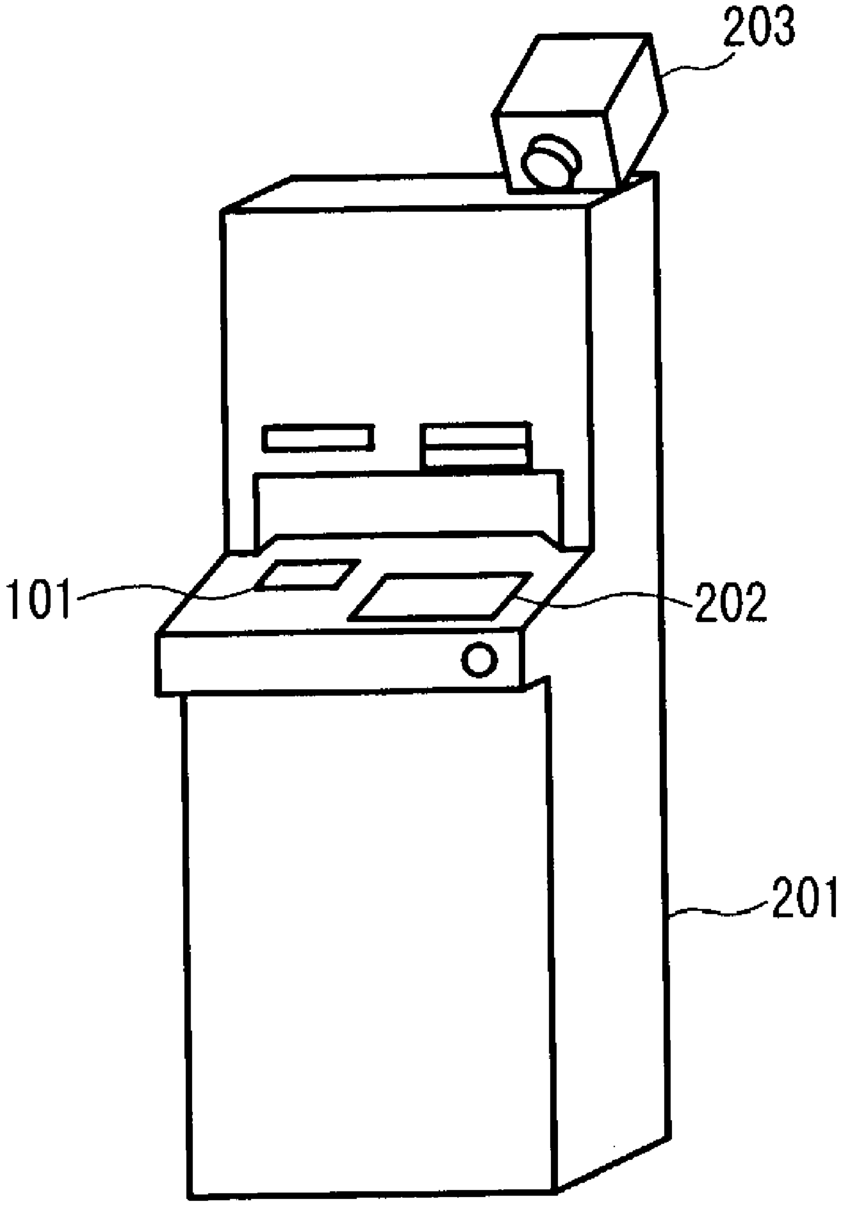
FIG. 2 is an external view of the automatic teller machine according to the present invention.

A first embodiment of the invention will be described with reference to the accompanying drawings. FIG. 1 is a block diagram of an automatic teller machine according to the present invention. Reference numeral 101 denotes a cash in/out unit, 102 denotes a bill separator, 103 denotes a bill validator, 104 denotes the main memory of the bill validator, 105 denotes a sensor, 110 denotes a temporary stacker, 120 and 121 denote cash recycling boxes, 122 denotes a cash box for unclassified notes, 123 denotes a cash box for spoiled notes, 124 denotes a cash box for counterfeit notes, 130 denotes a control unit, 131 denotes main memory of the control unit, 132 denotes auxiliary memory, and 140 to 143 denote transport devices. FIG. 2 shows an external appearance of the automatic teller machine, in which 201 denotes a housing of the automatic teller machine, 202 denotes a display, and 203 denotes an image pickup device.

When depositing money, the user of the automatic teller machine throws bank notes into the cash in/out unit 101, and the notes are separated one from the other by the bill separator 102 installed in the cash in/out unit 101, and are sent through the transport device 140 to the sensor 105. In response to a signal from the sensor 105, the bill validator 103 identifies the denomination of a note and classifies it as a genuine note or a counterfeit note. The categories in classification are genuine notes, counterfeit notes and unclassified notes.

The control unit 130 sends notes rejected by denomination identification and counterfeits detected by counterfeit/genuine classification back to the cash in/out unit 101 through the transport device 141. The control unit 130 collects notes other than the rejected or counterfeit notes in a temporary stacker 110 through the transport device 142. On the other hand, the main memory 131 of the control unit stores denomination information and information about results of counterfeit/genuine classification (as to whether the classification result indicates the note is genuine or unclassified) associated with the serial numbers of the notes. With regard to those notes whose results of counterfeit/genuine classification are unclassified notes, the main memory stores transaction information in addition to the above-mentioned information. Here, the transaction information is information, including data by which to identify at least people who deposited the notes (the depositor's name or ID, for example), and the information may include the numbers of accounts and transaction dates. Heretofore, unclassified notes by results of counterfeit/genuine classification have been rejected, but in this invention, the unclassified notes are accepted, which makes the number of rejected notes smaller than before.

The display unit shows the sum of money of notes put in the temporary stacker 110. If the customer does not acknowledge the sum of money shown on the display 202, the control unit 130 sends the notes, which have been in the temporary stacker 110, back to the cash in/out unit 101 through the transport device 142, the sensor 105 and the transport device 140. The information, stored in the main memory of the control unit, about the denomination and the result of counterfeit/genuine classification of the returned note is deleted.

Description will now be made of a case where the customer acknowledges the sum of money shown on the display 202. The notes that have been in the temporary stacker 110 are sent through the transport device 142 to the sensor 105. The control unit 130 reads information about the denominations and the result of counterfeit/genuine classification regarding the notes from the main memory 131 and sends it to the bill validator 103.

Nothing is done for the counterfeit notes classified as such by the results of counterfeit/genuine classification. A note turned out to be a genuine note is subjected to a fitness check by the bill validator 103 using a signal from the sensor 105. Here, the fitness check indicates a decision as to whether the note is a spoiled note as it was smeared or torn and therefore unusable, or a valid note. The information, such as about the denomination, counterfeit or genuine, regarding the note that has undergone a fitness check is deleted from the main memory by the control unit 130.

The control unit 130 sends out a valid note so classified by a result of a fitness check through the transport device 143 and has it stored in cash recycling box 120 or 121 according to the denomination, for example. A spoiled note judged as such by a result of a fitness check is sent through the transport device 143 and is stored in the cash box 123 for spoiled notes. An unclassified note according to a result of counterfeit/genuine classification is sent through the transport device 143 and is stored in the cash box 122 for unclassified notes. After all notes from the temporary stacker 110 been stored in the cash boxes, the control unit 130 executes a receiving transaction based on the sum of money paid in by the customer, by which the transaction is finished.

Then, the control unit 130 transfers transaction information and denomination information from its main memory 131 to auxiliary memory to store in it. At this time, the transaction information and denomination information is stored associated with the serial numbers of the notes contained in the cash box for unclassified notes, and the transaction information and denomination information in the main memory 131 is deleted.

When an image pickup device 203 is installed, it is possible to take a picture of the user and add this picture as information for personal identification. The control unit 130 adds this picture to transaction information stored in the main memory 131, and transfers this transaction information and denomination information from the main memory 131 to the auxiliary memory 132. For example, when another person posing as a principal throws in a counterfeit note, if a video image of the principal is available, it becomes clear on the spot that the nominal person of the account is not the person who paid in the note.

Figure 3:
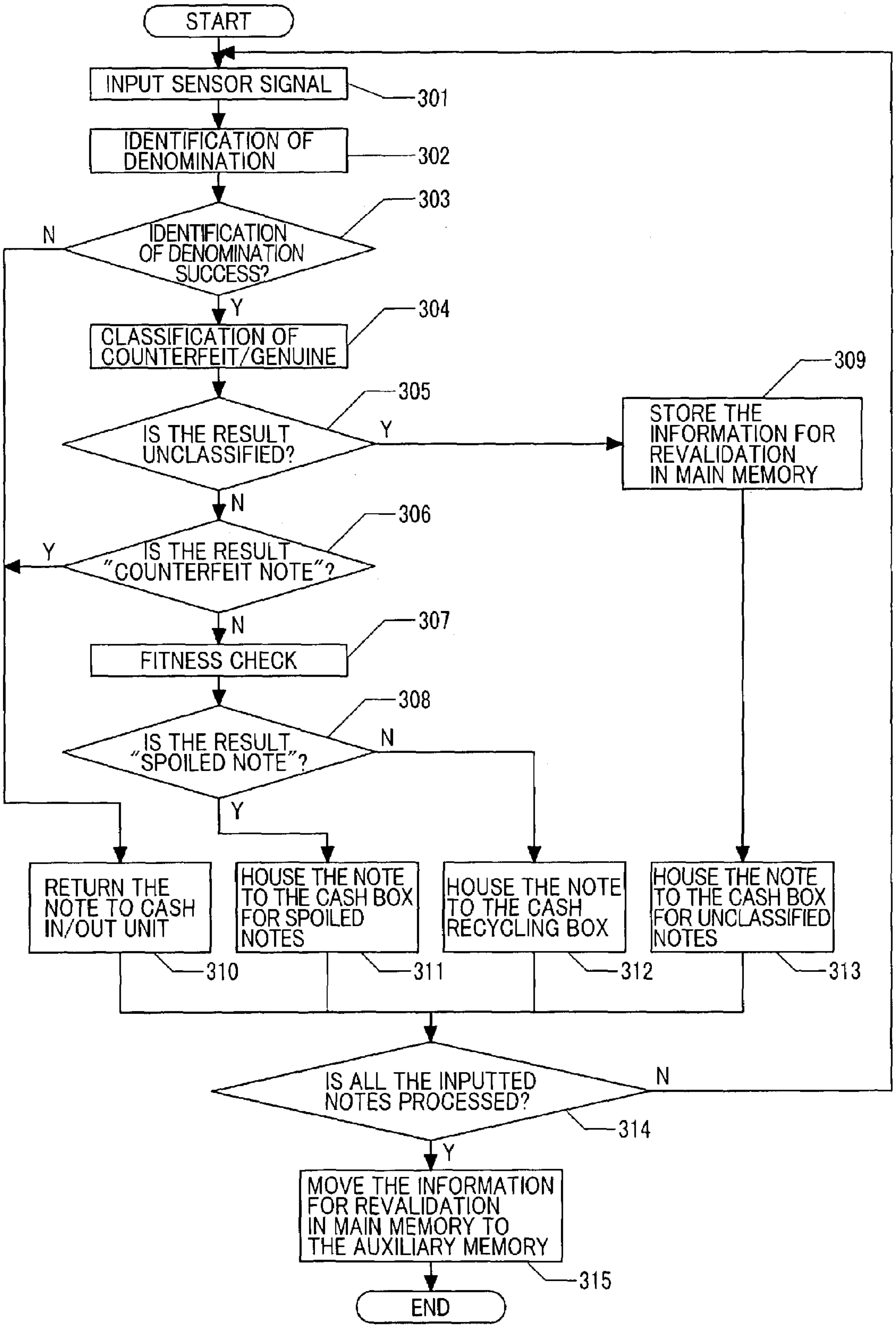
FIG. 3 is a flowchart of a money receiving process according to the first embodiment of the present invention.

FIG. 3 is a flowchart showing a verification process executed in the first bill validator. A signal obtained from the note deposited is input to the bill validator 103 (Step 301), and the bill validator 103 identifies the denomination (Step 302). The process branches off depending on whether the denomination identification is successful or the note is rejected (Step 303), and the rejected note is returned to the cash in/out unit (Step 310). The note which was identified in denomination identification is subjected to a counterfeit/genuine classification by the bill validator (Step 304).

The process branches off depending on whether a result of this classification is an unclassified note or not (Step 305), if the result in Step 304 is an unclassified note, the transaction information and denomination information are stored in the main memory 302 of the bill validator (Step 309), and the note is stored in the cash box for unclassified notes (Step 313). If the result of Step 304 is not an unclassified note, a branch operation by whether the result of the classification is a counterfeit or a genuine note is executed (Step 306). If the result of Step 304 is a counterfeit, the note is returned to the cash in/out unit 101, or if the result of Step 304 is a genuine note, the note is put to a fitness check (Step 307). The process branches off depending on whether the result of Step 307 is a spoiled note or not, and if the note is a spoiled note, the note is stored in the cash box for spoiled notes 124 (Step 311), or if the note is a valid note, the note is stored in the cash recycling boxes 120 or 121 according to the denomination (Step 312). If there are any other notes deposited, the above-mentioned operation is repeated (Step 314), and all deposited notes have been processed, the transaction information and the denomination information in the main memory 131 are stored in the auxiliary memory 132, and the transaction information and the denomination information in the main memory 131 are deleted (Step 315). At this time, the image of the user taken with the image pickup device may be added to the transaction information and stored in the auxiliary memory.

In a withdrawing transaction, notes to be paid out are supplied one after another from the recycling boxes 120 and 121. The notes supplied are transferred to the cash in/out unit 101 through the transport device 143, the sensor 105 and the transport device 141. At this time, the note may be sensed by the sensor 105, decisions as to the denomination, counterfeit/genuine, and fitness may be executed by the verification means 103, and notes unsuitable for withdrawal may be excluded. The notes unsuitable for withdrawal are the notes rejected in denomination identification, the notes judged as counterfeits or unclassified notes in counterfeit/genuine classification, and also the notes judged as spoiled in a fitness check. Since the notes in the cash recycling boxes 120, 121 are the notes paid in and the notes supplied by the bank, the incidence of the notes unsuitable for withdrawal is far less than the incidences of rejected notes on the basis of denomination at withdrawal, spoiled notes, unclassified notes, and counterfeits. If a note unsuitable for withdrawal is detected, the note that has passed the sensor 105 is stored in the temporary stacking means 110, and the result of verification is stored in the main memory 131 associated with the serial number of the note. After the withdrawing transaction, the notes are output from the temporary stacking means 110 one after another and passed through the sensor 105, and are transported through the transport device 143 to the cash boxes. At this time, the notes judged as counterfeits based on verification results stored in the main memory 131 are transported to the counterfeit note box 124, the notes judged as unclassified in counterfeit/genuine classification are transported to the unclassified note box 122, and the notes judged as spoiled and the notes rejected in denomination identification are transported to the spoiled note box 123. Note that when notes are stored in the unclassified note box 122, the denomination information and information that the note is an unclassified note detected at withdrawal is stored in the auxiliary memory 132 associated with the order in which the notes are stored.

Referring to FIG. 1, description will be made of the procedure by which to re-verify the notes stored in the unclassified note box 122. The notes unclassified in counterfeit/genuine classification in a cash receiving transaction are stored in the unclassified note box 122. In response to a command from the control unit 130, the notes stored in the unclassified note box 122 are output one note at a time during non-transaction hours when the automatic teller machine is not engaged in transaction work. The next note is output after the re-verification of the previous note has been finished.

The order in which notes are output from the unclassified note box 122 may be in any order. However, since it is necessary to take a quick action when a counterfeit note is detected, the action most suitable for this purpose is FIFO (First-In First-Out). In other words, the note that was thrown in first is re-verified first.

The control unit 130 causes the transport device 143 to transfer a note from the unclassified note box 122 to the position of the sensor 105. The sensor 105 senses the note, the bill validator 103 reads denomination information from the auxiliary memory 132 and identifies its denomination, and executes re-classification to see whether the note is a counterfeit or a genuine note by a signal from the sensor 105. While the bill validator 103 performing verification, the note is stored in the temporary stacker 110. The note judged valid by the counterfeit/genuine re-classification is then subjected to a fitness check over again.

The verification carried out in a cash receiving transaction needs to be executed at high speed in order to shorten the transaction time. On the other hand, re-verification, which is carried out during non-transaction hours, may be executed by giving it enough time. Therefore, in re-verification work, when the sensor 105 senses a note, the note is transported at low speed to collect more stable signals with higher resolution than the signals obtained in the cash receiving transaction. The bill validator 103 can use those signals and a re-verification algorithm including a larger amount of calculation than in verification in the cash receiving transaction. In this manner, the verification accuracy in re-verification can be made higher than in verification in the cash receiving transaction. In response to a signal from the control unit 130, the note which has been re-verified is transported passing the transport device 142, the sensor 105 and the transport device 143, and stored in the cash boxes according to results of re-verification. The note judged genuine and valid by a result of re-verification may be classified into the spoiled note box considering the fact that the note whose result of counterfeit/genuine classification was an unclassified note. However, with a recycling type automatic teller machine, the more notes it has ready for withdrawal, the more withdrawing transactions it can handle, for which reason the notes are classified according to denominations, for example, and stored separately in the recycling cash boxes 120, 121. At this time, transaction information and denomination information regarding the notes in the auxiliary memory 132 is deleted. If a re-verification result shows that a note is a spoiled note, the note is stored in the spoiled note box 123, and transaction information and denomination information regarding the note in the auxiliary memory 132 is deleted. If the re-verification result shows that the note is a counterfeit, this counterfeit note is stored in the counterfeit note box 124.

Figure 4:
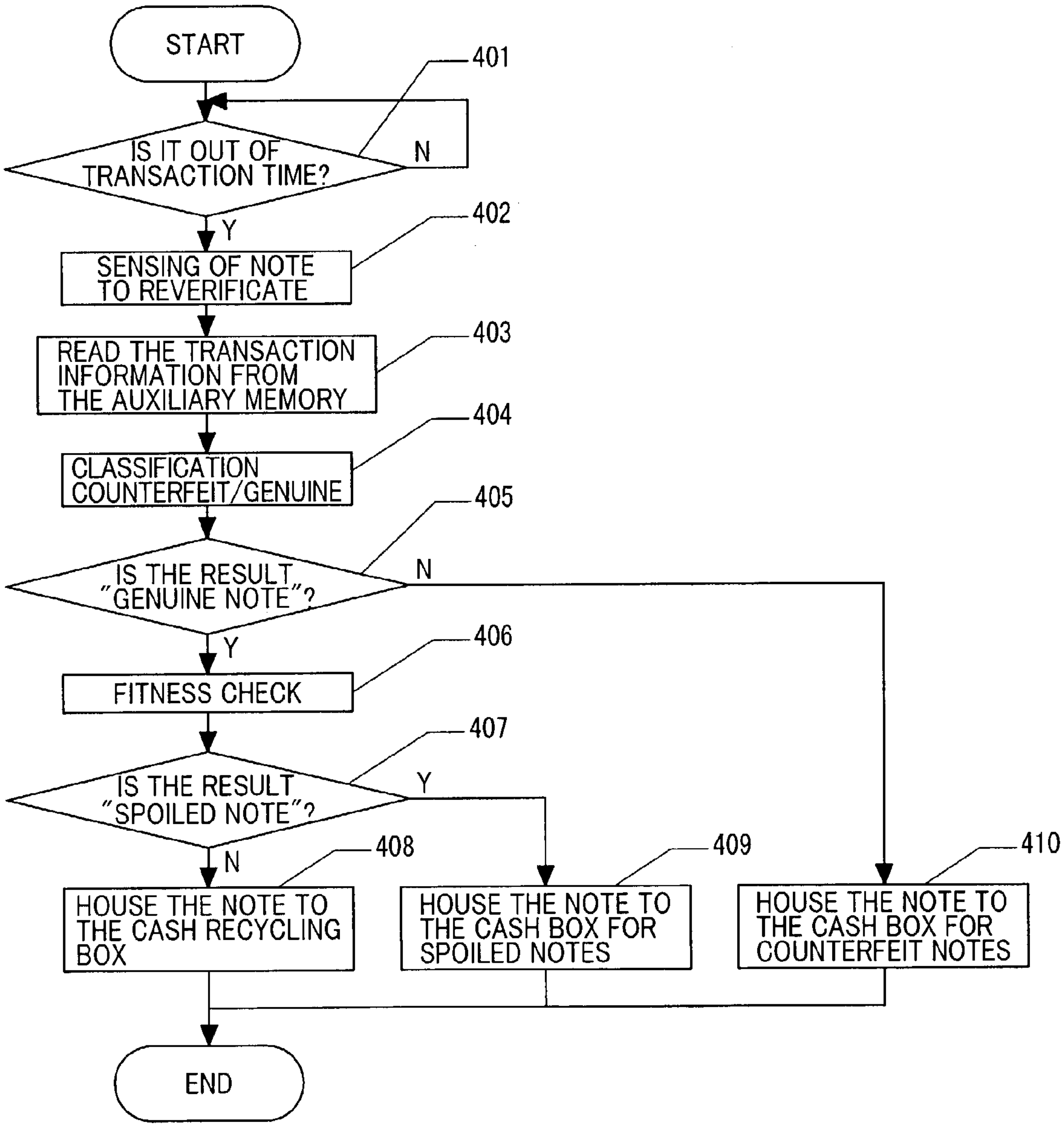
FIG. 4 is a flowchart of a re-verification process according to the first embodiment of the present invention.

FIG. 4 is a flowchart showing a re-verification process with a focus on the verification process. The control unit 130 is overwatching the teller machine to see when transaction hours are over (Step 401), and when transaction hours are over, the control unit 130 causes the sensor 105 to sense a note under re-verification (Step 402). The control unit 130 reads transaction information and denomination information regarding the note from the auxiliary memory 132 (Step 403), and the bill validator 103 receives a signal read in at Step 402 and information obtained in Step 403, and executes counterfeit/genuine re-classification (Step 404). The process branches off depending on a result of the re-verification (Step 405). If the re-classification result shows that the note is a counterfeit, this note is stored in the counterfeit note box 124, by which the process is finished (Step 410). If the re-classification result shows that the note is genuine, the bill validator executes a fitness check (Step 406), and the process branches off depending on a result of the fitness check (Step 407). If the fitness check result shows that the note is a valid note, the note is stored in the recycling cash box 120 or 121 (Step 408), by which the process is finished. At this time, whether the note is stored in the recycling cash box 120 or 121 is decided by the denomination, for example. If the fitness check result shows that the note is a spoiled note, the note is stores in the spoiled note box 123, by which the process is finished (Step 409).

Figure 5:
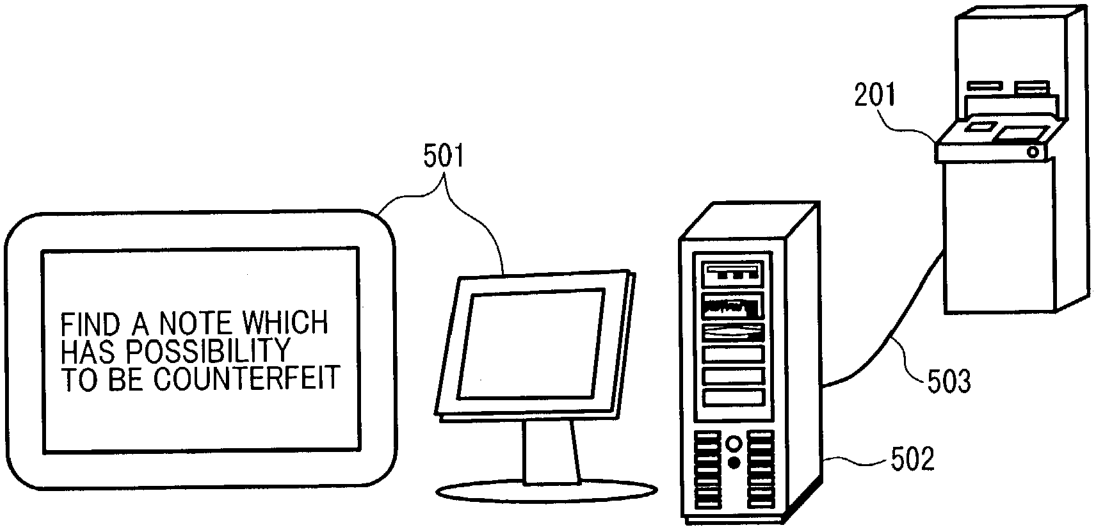
FIG. 5 is a conceptual diagram of a method of notifying an occurrence of a counterfeit note.

Description will now be made of a process executed when a counterfeit is detected in the re-verification by the bill validator 103. At this time, as shown in FIG. 5, the automatic teller machine 201 notifies the host computer 502 of an occurrence of a counterfeit note by a message on the display 501 on the host side, transmitted through a communication cable 503 connected to the host computer. The host computer is a computer supervising the operation of the automatic teller machines.

Figure 6:
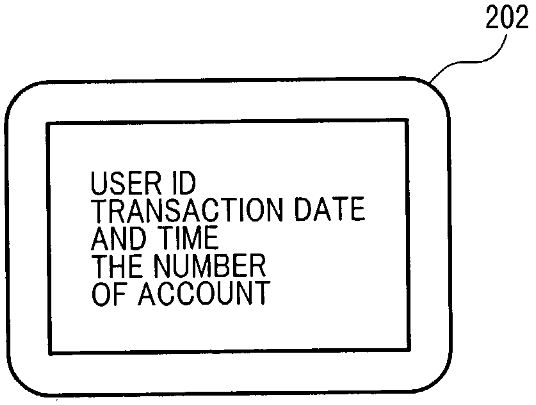
FIG. 6 is a conceptual diagram of a method of displaying information about a person who paid in a counterfeit note.

Transaction information about the counterfeit note stored in the auxiliary memory 32 is read out in advance, and from the transaction information, information by which to identify the person who paid in the note in question (such as the name, ID, picture), and information about the number of the bank account, the transaction date or the like are obtained and shown on the display 501. Also, as shown in FIG. 6, a display 202 on the automatic teller machine may be used to notify information by which to identify the user of the counterfeit (such as the name, ID, picture), the account number, transaction date, etc. for use by the person in charge of counterfeit disposal when the counterfeit note is retrieved. It ought to be noted here that even if there is no identification information about the user of the note judged as a counterfeit in re-verification, the above method has an effect that the counterfeit note is not dispensed to any user.

If video recording is always performed by the image pickup device 203, it is possible to retrieve images taken on the transaction date, and show the images on the display 501 or on a screen of transaction equipment. At this time, identification information about the user of the counterfeit (the name, ID, etc.), and the bank account number, the date of transaction are displayed.

Description will move on to the method for securing the safety of a verification algorithm in relation to a new bogus note. With regard to a note judged as an unclassified note in verification at the time of a money receiving transaction, a signal from the sensor 105 as well as transaction information and denomination information are stored in the auxiliary memory 132. When a counterfeit note is detected in re-verification, this signal stored in the auxiliary memory 132 is sent to the host computer 502. On the host computer 502, a verification algorithm adapted to reject counterfeit notes is generated for use in a money receiving transaction, and this algorithm is transmitted to other automatic teller machines over a network to replace the hitherto-used algorithms. A new algorithm for verification may be generated automatically in some cases, or may be completed by being assisted by manual work in other cases. Either way, the safety of the automatic teller machine can be protected against new counterfeit notes. For example, there is a method in which a decision algorithm is added which uses a sensor value obtained from a new counterfeit note as a threshold value.

Figure 7:
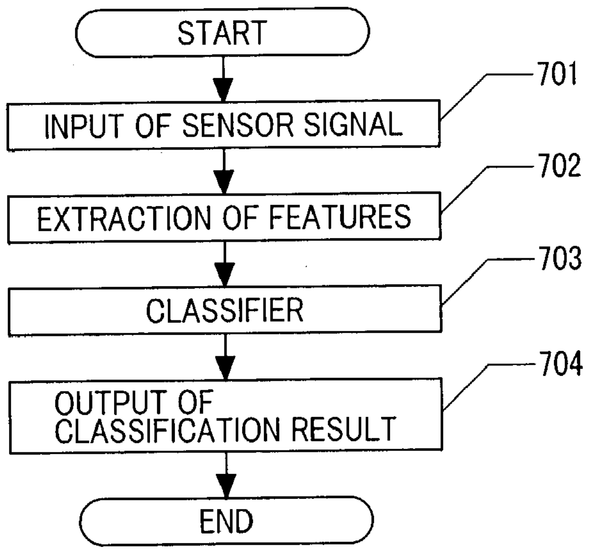
FIG. 7 is a flowchart of a counterfeit/genuine classification process and a fitness check process.
Figure 8:
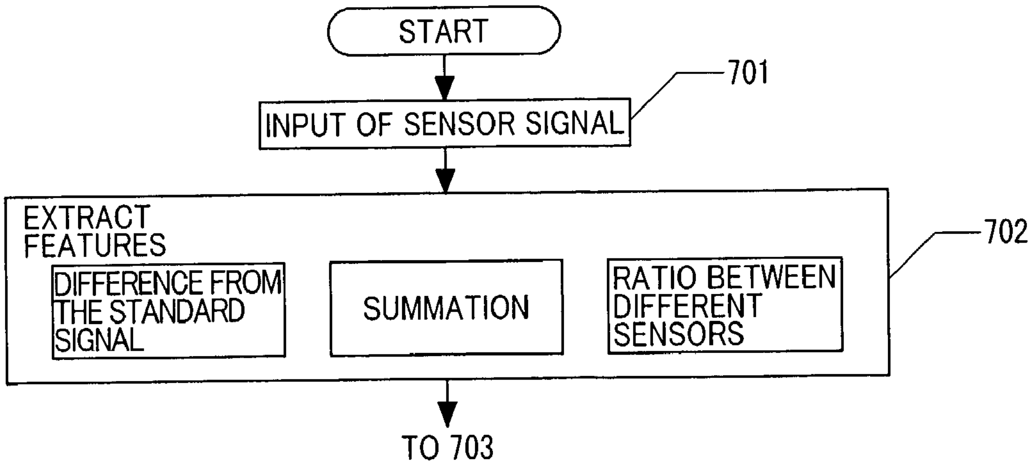
FIG. 8 is a flowchart of extraction of features in the counterfeit/genuine classification process in FIG. 8.
Figure 9:
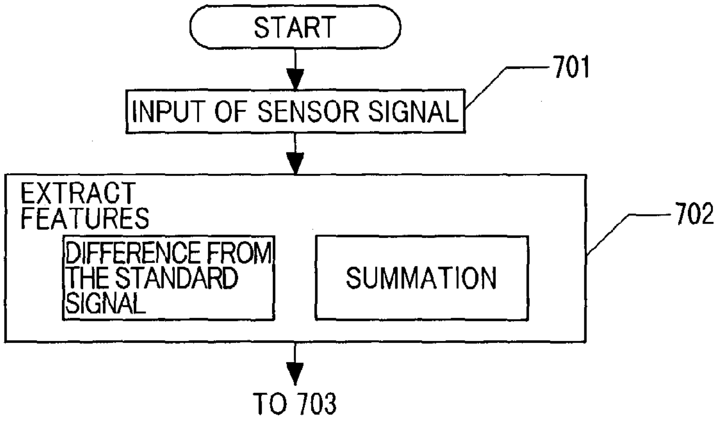
FIG. 9 is a flowchart of extraction of features in the fitness check process in FIG. 8.
Figure 10:
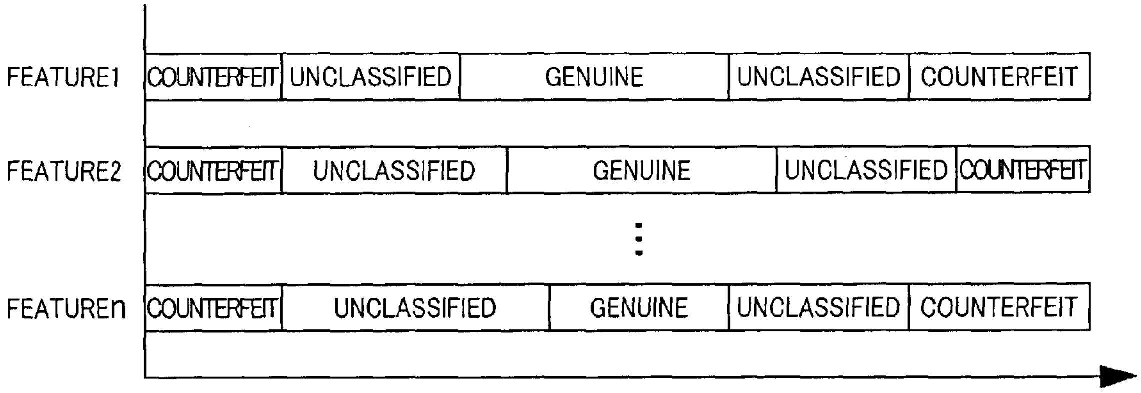
FIG. 10 is a conceptual diagram in an example of the classifier in FIG. 8.

Description will next be made of a counterfeit/genuine classification process and a fitness check process. FIG. 7 is a rough flow of a counterfeit/genuine classification process and a fitness check process. FIG. 8 is a flow showing the extraction of features in the counterfeit/genuine classification process. FIG. 9 is a flow showing the extraction of features in the fitness check process. FIG. 10 is a diagram of an example of the classifier. In the counterfeit/genuine classification process and the fitness check process, a sensor signal representing measured values of a note is input (701), features are extracted (702), the quantities of features are input to a classifier (703), and a classification result is output (704).

In the extraction of features in the counterfeit/genuine process, as shown in FIG. 8, a difference value from a standard signal, a summation value of signals, ratios between different sensors, for example, are extracted and input to the classifier. In the extraction of features in the fitness check process, as shown in FIG. 9, a difference signal from a standard signal, a summation value of signals, for example, are extracted and sent to the classifier.

In the classifier, a threshold value process is executed as shown in FIG. 10, for example. In FIG. 10, a counterfeit/genuine classification is shown as an example, but a fitness check can also be done. Classification into a genuine note, a counterfeit note, or an unclassified note or classification into a valid note, a spoiled note or an unclassified note is carried out for each of feature quantities 1, 2, . . . n using preset threshold values. Classification results of respective features are consolidated, for example, by the following methods: 1. A final decision is that the note is a genuine note when all decisions are that the note is a genuine note. 2. A final decision is that the note is an unclassified note when there is no decision that the note is a counterfeit note but there is a decision that the note is an unclassified note. 3. A final decision is that the note is a counterfeit if there is one decision that the note is a counterfeit. And, a final decision is output. With regard to the above-mentioned consolidation method, the same method may be applied to a fitness check. The method for embodying the classifier is not limited to the above-mentioned case, but general methods of pattern recognition, such as Linear discrimination, Baysian discrimination, Subspace method, Neutral network, Support vector machine, etc. may be used for classification.

(Embodiment 2)

A second embodiment of the present invention will be described. A difference from the first embodiment in a money receiving transaction is that, in Step 309, an output signal from the sensor 105 obtained in verification in the money receiving transaction, as well as transaction information and denomination information, is stored in the main memory 131 of the control unit. After the transaction is finished, in Step 315, the transaction information and denomination information and the output signal from the sensor 105 are stored in the auxiliary memory 132.

Figure 11:
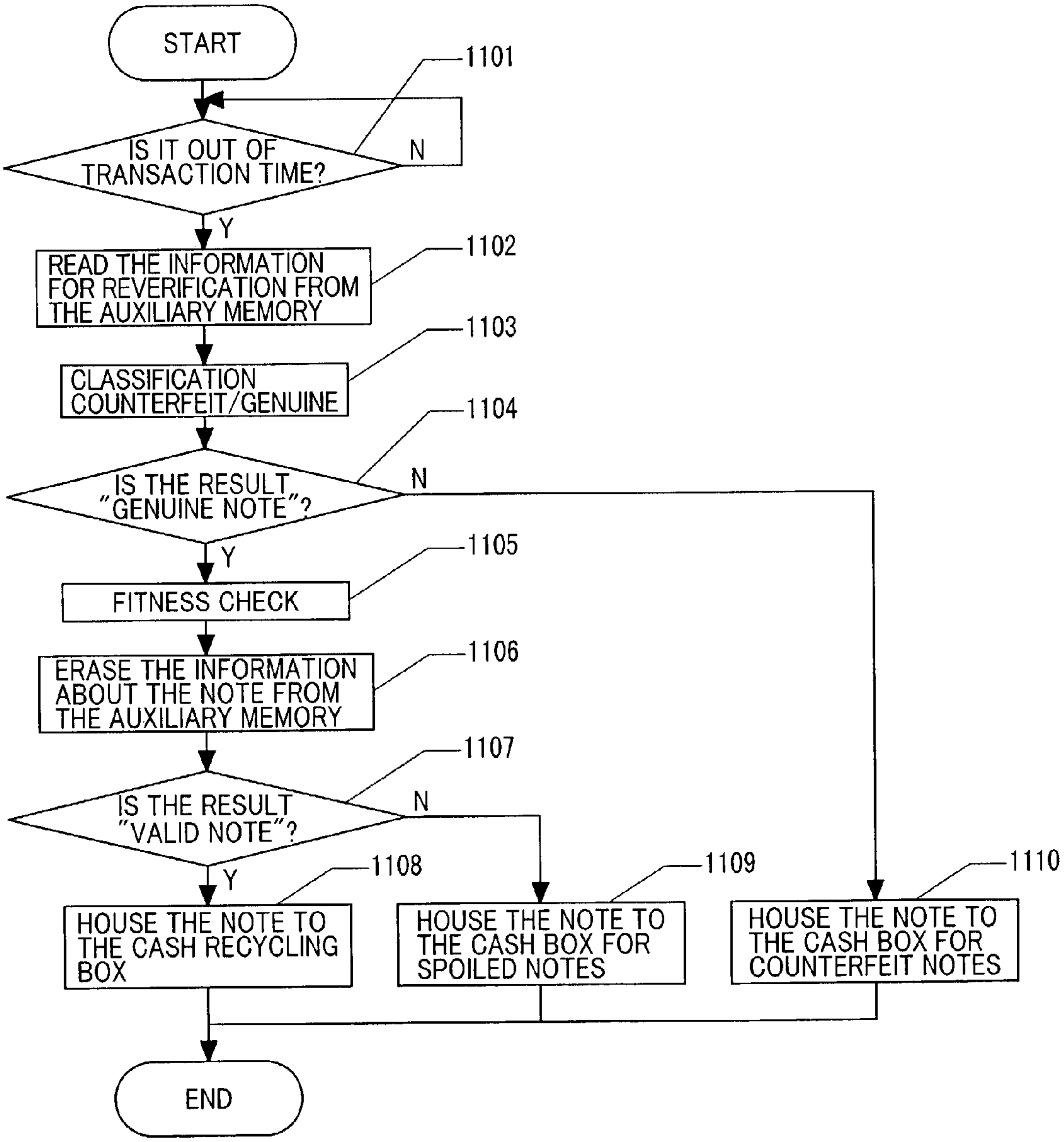
FIG. 11 is a flowchart of the re-verification process according to a second embodiment of the present invention.

FIG. 11 is a flowchart of the re-verification process. The control unit 130 is overwatching the automatic teller machine 201 to see when transaction hours are over (Step 1101). After transaction hours, the control unit reads necessary information, such as transaction information, denomination information, a sensor signal, for re-verification from the auxiliary memory 132 (Step 1102). After this, the control unit executes counterfeit/genuine classification (Step 1103) using an algorithm including a larger amount of calculation than the algorithm used in the transaction by the bill validator 103, and the process branches off depending on a result of counterfeit/genuine classification (Step 1104). If a classification result is a counterfeit, the control unit 130 stores this re-verified note in the counterfeit note box 124, by which the re-verification process is finished (Step 1110). If the classification result tells that the note is a genuine note, the process proceeds to the execution of a fitness check (Step 1105), and the control unit 130 deletes transaction information and denomination information regarding the note and a signal of the sensor 105 from the auxiliary memory 132 (Step 1106). Subsequently, the process branches off depending on a result of the fitness check (Step 1107), and if the fitness check result shows that the note is a valid note, the control unit 130 classifies the re-verified note according to the denomination, for example, and stores the note into the recycling cash box 120 or 121, by which the re-verification process is finished (Step 1108). If the fitness check result tells that the note is a spoiled note, the note that has been re-verified is stored in the spoiled cash box 123, by which the re-verification process is finished (Step 1109).

Since a signal obtained from a note transported at high speed is used at the transaction in the second embodiment, the verification accuracy in the second embodiment is lower than in the first embodiment in which a signal is obtained while a note is being transported at low speed. However, because a signal need not be obtained again by the sensor 105 at the time of re-verification, the transportation of notes is only from the unclassified note box 122 to the recycling cash boxes 120, 121, the spoiled note box 123, and the counterfeit note box 124. This is an advantage that re-verification has less effect on transactions, with the result that a transaction can be performed promptly even when a customer comes while the re-verification process is in progress. It is chiefly while a note re-verified is being stored into a specified cash box that a transaction cannot be started. Because notes are stored one sheet at a time, the storing action of a note is finished quickly. A switch-over of the bill validator currently occupied with re-verification to the state that it can perform verification in an ordinary transaction is a switch-over on software and can be done at high speed.

(Embodiment 3)

Figure 12:
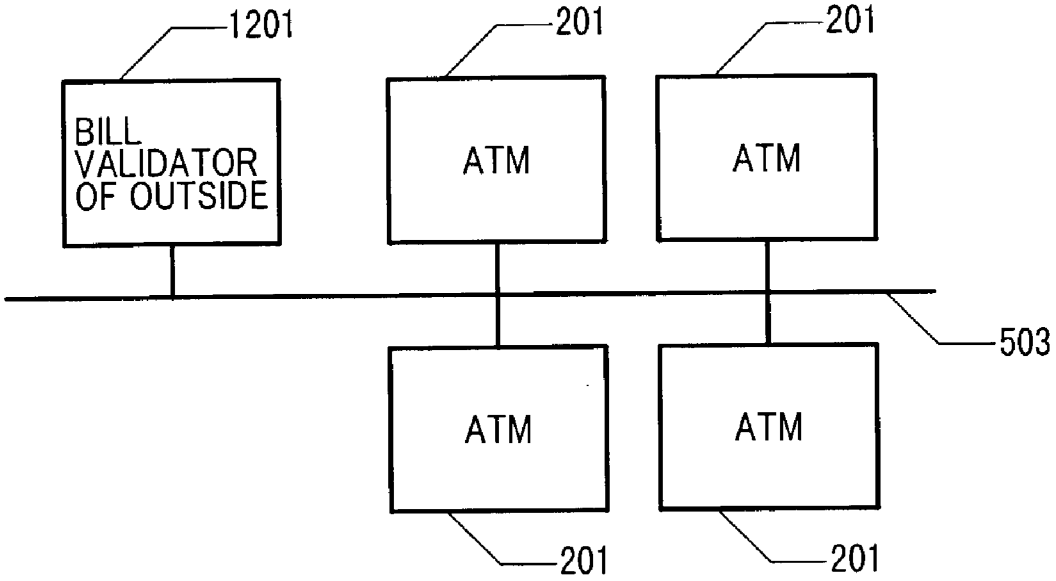
FIG. 12 is a block diagram of a note transaction system according to a third embodiment of the present invention.

FIG. 12 shows a third embodiment of the present invention. An external bill validator 1201 is connected through the communication line 503 to a plurality of automatic teller machines 201.

The operation flow in a money receiving transaction in the third embodiment is almost the same as the flow in FIG. 3, with the exception that the action in Step 309 differs. In the third embodiment, in Step 309, in addition to transaction information and denomination information, a signal obtained by the sensor 105 at the time of a money receiving transaction is stored in the main memory of the control unit 131. In Step 315 after the end of the transaction, in addition to transaction information and denomination information, a signal output from the sensor 105 is stored in the auxiliary memory 132.

Figure 13:
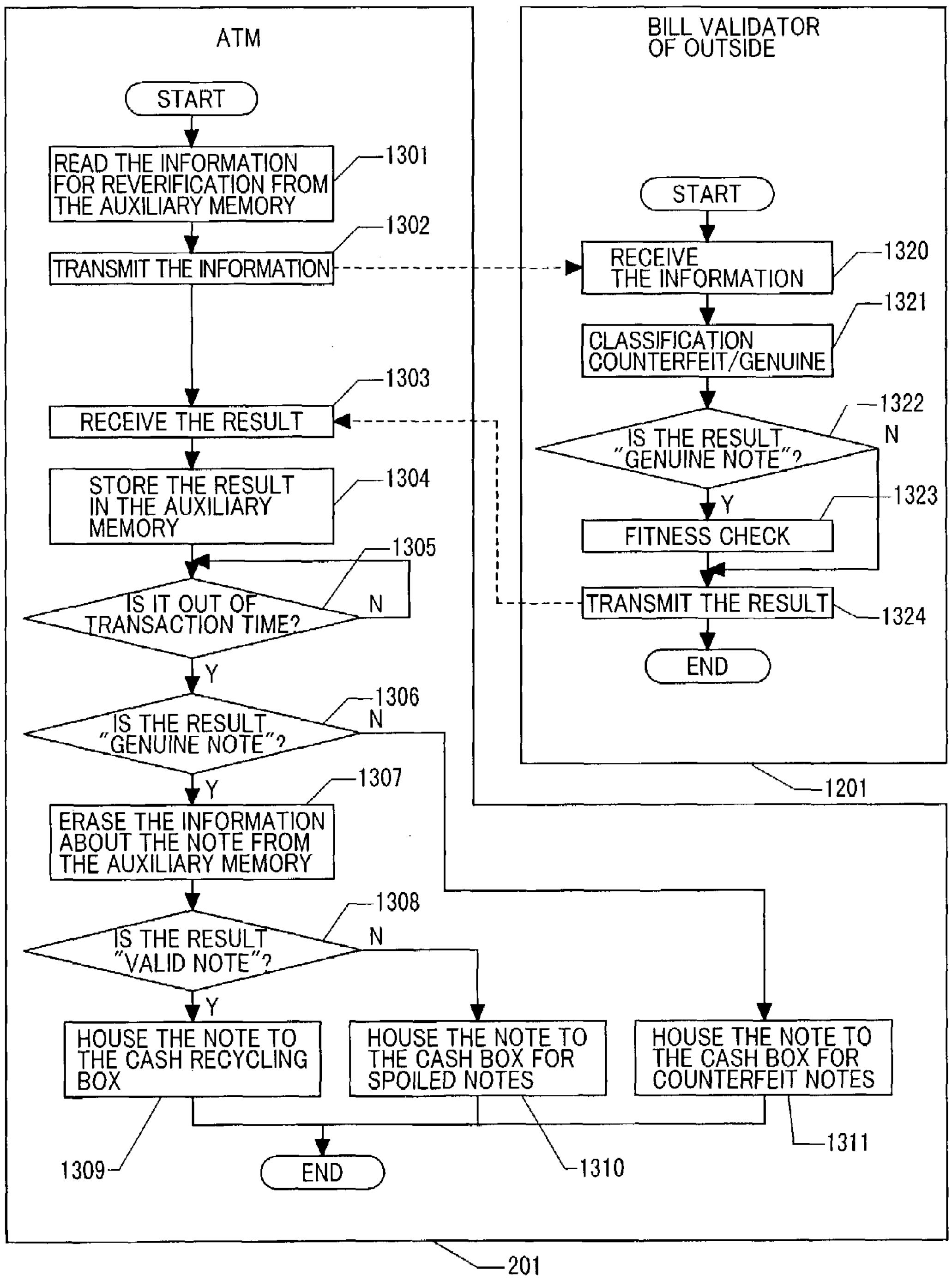
FIG. 13 is a flowchart of the re-verification process according to a third embodiment of the present invention.

FIG. 13 shows the flow of the re-verification process. The control unit 130 reads denomination information and a signal obtained in verification at the time of a money receiving transaction from the auxiliary memory 132 (Step 1301) and sends those items of information to the external bill validator 1201 through the communication line 503 (Step 1302). The external bill validator 1201 receives denomination information and a signal on the note under re-verification from the sensor 105 (Step 1320). The external bill validator identifies the denomination from the denomination information, and executes counterfeit/genuine classification (Step 1321). The process branches off depending on a result of the classification (Step 1322), and if the result of counterfeit/genuine classification is a genuine note, the control unit 130 performs a fitness check (Step 1323), and if the result of counterfeit/genuine classification is a counterfeit note, the control unit skips a fitness check (Step 1323). After this, the result of counterfeit/genuine classification is transmitted to the automatic teller machine 201 (Step 1324). The automatic teller machine receives the result of the classification (Step 1303), and stores the result in the auxiliary memory (1304). The control unit 130 is overwatching the automatic teller machine 201 to see when transaction hours are over (Step 1305). After transaction hours, the process branches off depending on a result of counterfeit/genuine classification (Step 1306), and if the classification result is a counterfeit note, the control unit 130 stores the note re-verified in the counterfeit note box 124 (Step 1311), by which the process is finished. If the classification result is a genuine note, transaction information and denomination information about the note is deleted from the auxiliary memory 132 (Step 1307). After this, the process branches off depending on a result of a fitness check (Step 1308), and if the fitness check result is a valid note, the re-verified note is classified according to its denomination, and stored in the recycling cash box 120 or 121 (Step 1309), by which the process is finished, or if the fitness check result is a spoiled note, the note is stored in the spoiled note box 123, by which the process is finished (Step 1310).

As has been described, the bill validator that performs re-verification is provided outside, and the sensor 105 is not used for re-verification; therefore, re-verification can be continued while a transaction is underway. Therefore, re-verification proceeds without delay even during hours when transaction work load is heavy. It is chiefly while a note re-verified is being stored into a specified cash box that a transaction cannot be started. Because notes are stored one sheet at a time, the storing action of a note is finished quickly. However, a signal is obtained while a note is transported at low speed in the first embodiment, but in the third embodiment a signal is obtained from a note being transported at high speed at the time of a transaction. Therefore, the first embodiment is more effective in terms of verification accuracy.

(Embodiment 4)

Figure 14:
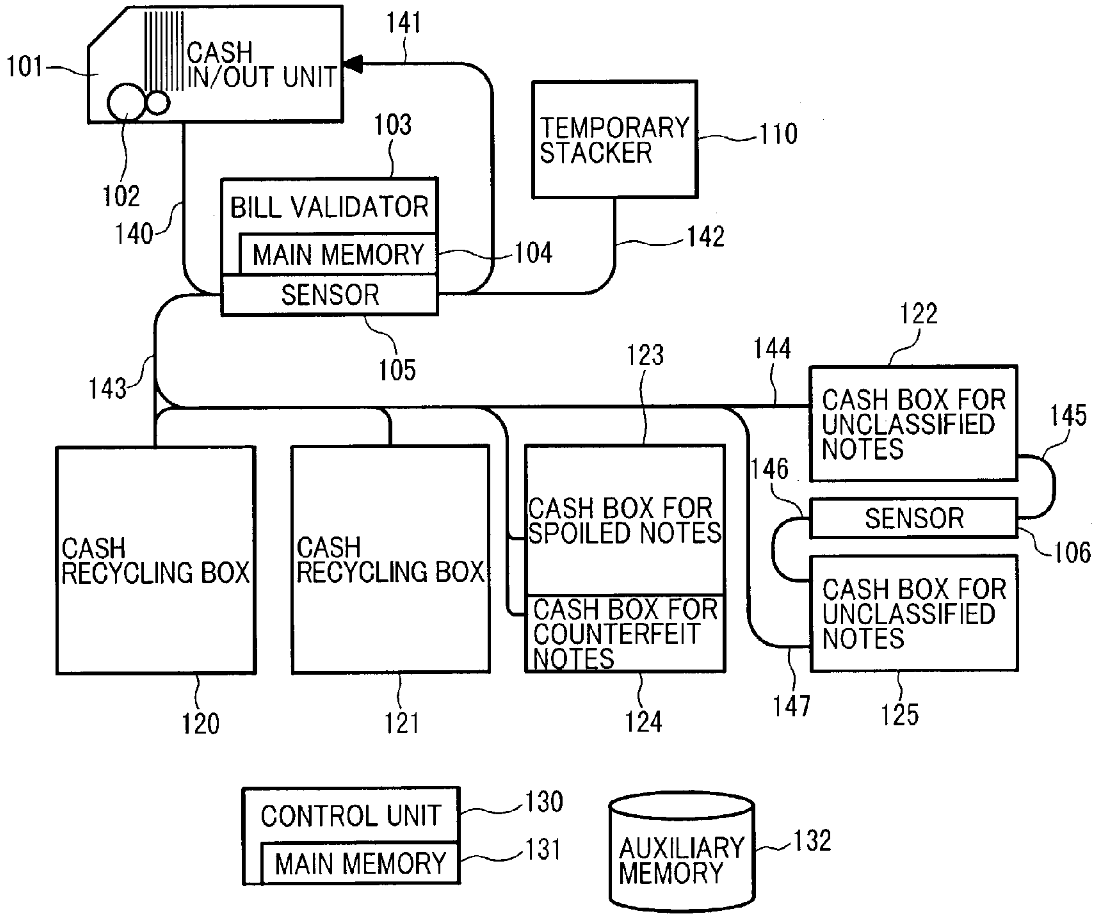
FIG. 14 is a block diagram of an automatic teller machine according to a fourth embodiment of the present invention.

FIG. 14 shows a fourth embodiment of the present invention, in which 105 denotes a second sensor, 125 denotes a second unclassified cash box, and 144 to 147 denote transport devices. As in the third embodiment in FIG. 12, a plurality of automatic teller machines 120 and an external bill validator 1201 are connected by communication means 601.

Figure 15:
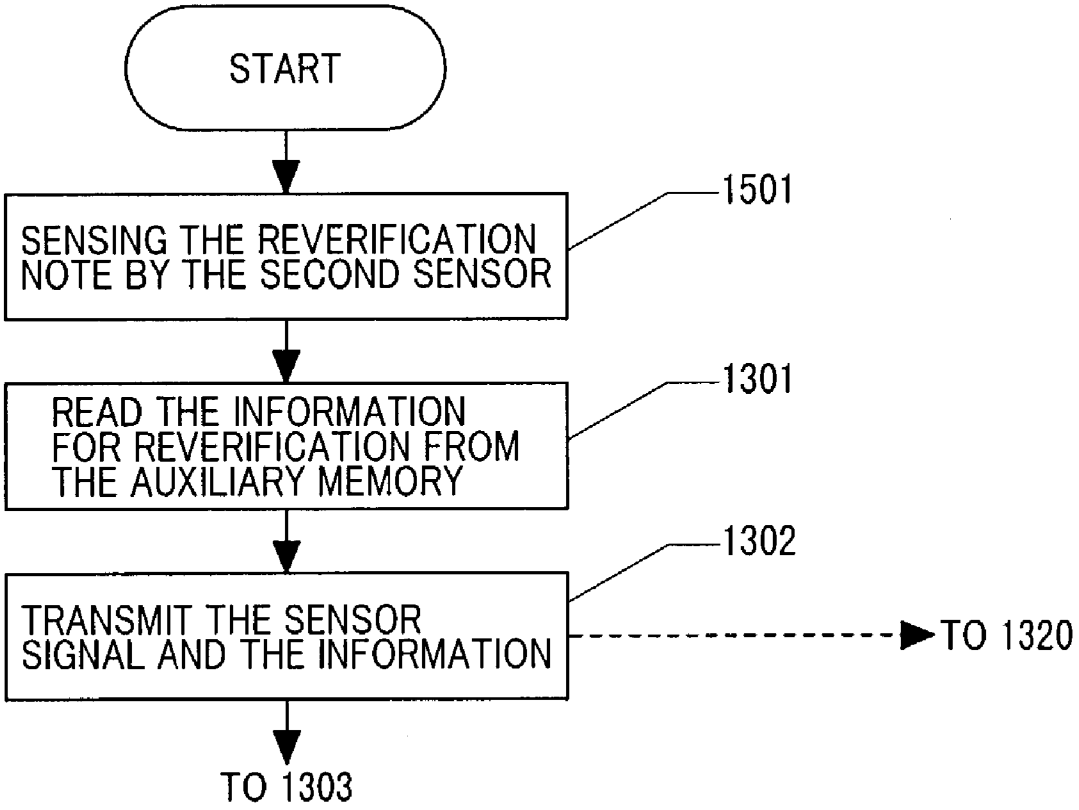
FIG. 15 is a flowchart of the re-verification process according to a fourth embodiment of the present invention.

The verification flow at the time of a money receiving transaction is the same as in the first embodiment (FIG. 4). FIG. 15 shows a re-verification process. The control unit 130 causes a second sensor 106 to sense a note (Step 1501), reads denomination information from the auxiliary memory 132 (Step 1301), and sends those items of information to the external bill validator 1201 through the communication line 503 (Step 1302). The subsequent steps are the same as those in the flow in FIG. 13. The fourth embodiment has the same advantage as that in the third embodiment, in other words, because a signal is obtained by another sensor separate from the sensor 105 in re-verification, re-verification can be continued while a transaction is in progress. Even during a time zone when transactions concentrate, re-verification work never gets retarded. It is chiefly while a note having undergone a re-verification process is being sent to the cash box that a transaction cannot be started. However, such an interruption ends quickly because notes are stored one sheet at a time and storing of a note after re-verification is finished soon.

Since a note is sensed while being transported at low speed, even if the second sensor is of the same kind as the first sensor, the resolution and the stability of signals that are output are improved, and the accuracy of re-verification is high accordingly. Because the first sensor needs to perform its function while a note passes at high speed, the resolution and the stability of the first sensor are limited. In contrast, the second sensor need not adapt to high-speed transport, and therefore a sensor of another type can be used which is better in resolution and stability than the first sensor. Therefore, the accuracy of re-verification can be further improved.

In the first to fourth embodiments, the result of denomination identification carried out at the time of a money receiving transaction is stored in the auxiliary memory 132, and counterfeit/genuine classification and a fitness check are performed by using denomination information stored in the auxiliary memory 132. However, it is possible to arrange a system in which the denomination of a note is identified each time re-verification is carried out without storing results of denomination identification in the auxiliary memory 132.

As has been described, according to the present invention, a note judged to be an unclassified note by the result of denomination identification at the time of a money receiving transaction, is subjected to re-verification after transaction hours, so that a percentage of rejected notes is reduced while carrying on the high-speed process in the transaction, and moreover the accuracy of counterfeit/genuine classification is improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An automatic teller machine comprising:

a cash in/out unit;

a sensor for sensing a note during a deposit transaction of said note;

transporting means for transporting said note from said cash in/out unit to said sensor at a first speed;

a control unit;

verification means for receiving signal information collected by said sensor, for determining whether a money value amount of said note is identifiable by said signal information, for verifying whether a money value amount identifiable note is genuine or counterfeit or unclassified by said signal information, and for outputting genuine or counterfeit or unclassified information;

unclassified note housing means for housing, during and after the deposit transaction, unclassified notes that have identifiable money value amounts and that are verified not being genuine or counterfeit by said signal information during the deposit transaction; and means for housing notes other than said unclassified notes.

2. An automatic teller machine according to claim 1, further comprising a memory for storing transaction information about notes housed in said unclassified note housing means.

3. An automatic teller machine according to claim 2, wherein after the deposit transaction is finished, said transporting means further transports notes, one at a time, from said unclassified note housing means at a second speed lower than the first speed, wherein said sensor re-senses said note transported at the second speed, and wherein said verification means receives a signal of said re-sensing and re-verify said note transported at the second speed.

4. An automatic teller machine according to claim 2, further comprising:

a memory for storing said signal information if said note is verified as unclassified;

re-verifying means for, after the deposit transaction is finished, reading stored signal information from said memory, and re-verifying said unclassified note by using an algorithm including a larger number of calculations than an algorithm applied in said verification.

5. An automatic teller machine according to claim 2, further comprising notification means for notifying that a counterfeit note has appeared as decided by said re-verification.

6. An automatic teller machine according to claim 5, wherein said notification means also provides transaction information about said note stored in said memory.

7. An automatic teller machine according to claim 2, wherein regarding a note judged to be a genuine note as a result of said re-verification, transaction information about said note is deleted.

8. An automatic teller machine according to claim 2, wherein when a note is judged to be a genuine note as a result of said re-verification, said note is treated as a note to be paid out.

9. An automatic teller machine according to claim 1, wherein after the deposit transaction is finished, said transporting means further transports notes, one at a time, from said unclassified note housing means at a second speed lower than the first speed, wherein said sensor re-senses said note transported at the second speed, and wherein said verification means receives a signal of said re-sensing and re-verify said note transported at the second speed.

10. An automatic teller machine according to claim 9, further comprising communication means connected to an external host computer, wherein when a result of a decision by said re-verification indicates that a counterfeit note has appeared, said communication means sends information necessary for classification of counterfeit/genuine, and receives a counterfeit/genuine classification algorithm generated by said information, and wherein said verification means or re-verification means uses said counterfeit/genuine classification algorithm.

11. An automatic teller machine according to claim 1, further comprising:

a memory for storing said signal information if said note is verified as unclassified;

re-verifying means for, after the deposit transaction is finished, reading stored signal information from said memory, and re-verifying said unclassified note by using an algorithm including a larger number of calculations than an algorithm applied in said verification.

12. An automatic teller machine according to claim 1, further comprising notification means for notifying that a counterfeit note has appeared as decided by said re-verification.

13. An automatic teller means according to claim 12, further comprising video recording means for recording a user in front of the cash in/out unit, wherein said notification means provides video picture recorded by said video recording means during the deposit transaction.

14. An automatic teller machine according to claim 1, further comprising communication means connected to an external bill validator having verification means, and a memory for storing signal information collected by said sensor on notes housed in said unclassified note housing means, wherein said communication means transmits said signal information and receives a result from said re-verification means.

15. An automatic teller machine according to claim 1, further comprising a second sensor, communication means connected to an external bill validator having re-verification means, wherein the second sensor, after the deposit transaction is finished, senses a note housed in said unclassified note housing means, wherein said communication means transmits a signal from said second sensor, and receives a result from said re-verification means.

16. An automatic teller machine according to claim 1, wherein said unclassified note housing means acts on a FIFO basis.

17. An automatic teller machine according to claim 1, where said verification means returns said note to said cash in/out unit if the money value amount of said note is unidentifiable.

18. An automatic teller machine comprising:

a cash in/out unit;

a sensor for sensing a note during a deposit transaction of said note;

transporting means for transporting said note from said cash in/out unit to said sensor;

verification unit for receiving signal information collected by said sensor, for verifying whether money value amount identifiable note is genuine or counterfeit or unclassified by said signal information as genuine or counterfeit during the deposit transaction, and for re-verifying after the deposit transaction is finished whether a unclassified note, which money value amount was identifiable note during the deposit transaction, is genuine or counterfeit or still unclassified by said signal information stored in a memory;

unclassified note housing means for housing, during and after the deposit transaction, unclassified notes that have identifiable money value amounts and that are verified not being genuine or counterfeit by said signal information during the deposit transaction; and unit for housing notes other than said unclassified note.

* * * * *